United States Patent
Mori et al.

[11] Patent Number: 5,879,816
[45] Date of Patent: Mar. 9, 1999

[54] METALLIC SLIDING MATERIAL

[75] Inventors: Kazuhiko Mori; Jun Kawaguchi; Takashi Koyama, all of Tokyo; Yoshio Fuwa; Hirofumi Michioka, both of Toyota, all of Japan

[73] Assignees: Nihon Parkerizing Co., Ltd.; Toyota Jidosha Kabushiki Kaisha, both of Japan

[21] Appl. No.: 758,251

[22] Filed: Nov. 27, 1996

[30] Foreign Application Priority Data

Nov. 30, 1995 [JP] Japan .................................. 7-312719

[51] Int. Cl.⁶ ............................ B32B 15/04; B32B 15/20
[52] U.S. Cl. .......................... 428/621; 428/628; 428/632; 428/651; 428/689; 428/697; 384/625; 384/913
[58] Field of Search ...................... 428/621, 628, 428/632, 633, 650, 651, 657, 472, 472.3, 689, 697; 384/625, 907, 913

[56] References Cited

U.S. PATENT DOCUMENTS

| 4,101,319 | 7/1978 | Beyer et al. . |
| 4,146,410 | 3/1979 | Reinhold . |
| 4,836,695 | 6/1989 | Baureis et al. . |
| 5,352,541 | 10/1994 | Tanaka et al. . |

FOREIGN PATENT DOCUMENTS

| 0059273 | 9/1982 | European Pat. Off. . |
| 0399425 | 11/1990 | European Pat. Off. . |
| 847800 | 11/1956 | United Kingdom . |
| 1227452 | 8/1968 | United Kingdom . |
| 2054648 | 2/1981 | United Kingdom . |
| 2259920 | 3/1993 | United Kingdom . |

*Primary Examiner*—Steven P. Griffin
*Attorney, Agent, or Firm*—Pillsbury Madison & Sutro, LLP

[57] ABSTRACT

A metallic sliding material including at least a support member with a sliding surface and an inorganic compound coating layer formed on the sliding surface is disclosed. The sliding surface is formed from an aluminum alloy or a reinforcing material-containing aluminum alloy. The inorganic compound coating layer is formed from at least one aluminum compound, and at least one phosphorus compound, and at least one member selected from the group of molybdenum compounds, tungsten compounds, and chromium compounds. These compounds are present in such concentrations that molybdenum, tungsten, and chromium collectively constitute 2 to 48% by weight of the inorganic compound coating layer, aluminum constitutes 1 to 25% by weight of the inorganic compound coating layer, phosphorus constitutes 1 to 25% by weight of the inorganic compound coating layer, and the balance of the inorganic compound coating layer is oxygen and impurities.

6 Claims, 5 Drawing Sheets

Fig.1

METALLIC SLIDING MATERIAL

BACKGROUND OF THE INVENTION

1. Field of the Invention

The present invention relates to a metallic sliding material usable for transportation machines, for example, motorcars and motor ships, and common industrial machines, and methods for producing the same. More particularly, the present invention relates to a metallic sliding material useful for producing parts of engines and methods of producing the same.

2. Description of the Related Art

Generally, metallic sliding members for engines are produced by working a sliding non-ferrous metal material, for example, aluminum alloy material, or a composite material made by joining a sliding non-ferrous metal alloy layer to a metallic support member into a desired form, for example, in the case of a slide bearing, the composite material is worked into a form of a cylindrical bush or a half cut cylinder.

Conventionally, copper-tin alloys and aluminum alloys have been used as an alloy for the metallic sliding materials. However, currently, to respond to requirements of high rotation speed and output of engines and of reduction in production cost of the engines, aluminum alloys and fiber-reinforced aluminum alloys are increasingly employed for the metallic sliding materials.

As an aluminum alloy for the metallic sliding materials, generally, an aluminum-tin alloy is employed. When the content of tin in the alloy is high, the resultant aluminum-tin alloy can be used even when no overlay is formed thereon. However, for a high quality metallic sliding material, the aluminum-tin alloy has relatively low content of tin of 5 to 7%, to enhance the fatigue resistance and the corrosion resistance of the alloy. In the case of the low tin content aluminum alloy, a soft tin or lead overlay coating must be formed on the aluminum alloy layer to enhance an initial running-in property of the aluminum alloy layer.

The aluminum alloys which must be plated with a overlay, are JIS 5402, AJ-1 (10%Sn-0.75%Cu-0.5%Ni and Bal. of Al), JIS 5402, AJ-2 (6%Sn-2.5%Cu-1.0% Ni and Bal. of AQ), and JIS AC8A (12%Si-1.0%Cu-1.5% Ni and Bal. of AQ).

When a soft metal overlay is formed on the aluminum alloy surface of the metallic sliding material, the resultant metallic sliding material may be disadvantageous in that when a high load is applied to the sliding material and the temperature of the sliding surface thereof is elevated due to a rise in the temperature of lubricant oil applied to the sliding surface, a fatigue phenomenon, a seizure phenomenon and/or a wearing phenomenon occurs at the sliding surface because the soft metal overlay has a low melting temperature, and thus the sliding material may become unusable.

Also, a method in which a metal material for the sliding material is mechanically worked and then an electric plating procedure is applied to the worked metal material to form an overlay thereon is known. However, this method is disadvantageous in that a plurality of working steps must be applied and thus the productivity of the method is low and the cost is high.

European Patent No. 0059273 and U.S. Pat. No. 4,836,695 for H. P. Baurels et al. discloses a slide bearing which is an example of a metallic sliding material and is produced by forming a chemical conversion coating having an excellent heat resistance on an aluminum alloy surface.

In the European patent, a zinc phosphate coating is formed on an aluminum alloy layer for the slide bearing to release a locally concentrated load on the aluminum alloy layer so as to evenly distribute the load over the sliding surface of the bearing and to enhance the running-in property of the aluminum alloy layer. The technique of the Japanese publication improves the technique of the European patent by preventing a formation of the zinc phosphate coating on the outer peripheral surface of the slide bearing layer.

Nevertheless, in the aluminum alloy slide bearings coated by the zinc phosphate coating as mentioned above, since the zinc phosphate exhibits a high crystallization property, the resultant coated sliding surface exhibits an insufficient smoothness and a low abrasion resistance and therefore, the resultant bearing material exhibits an unsatisfactory seizure resistance and abrasion resistance.

U.S. Pat. No. 4,836,695 teaches that when a slide bearing is fixed to a housing of the slide bearing, the coarse crystals of zinc phosphate coated on the back surface of the slide bearing cause the fixing of the slide bearing to the housing to be loosened. To prevent this loosening, a special treatment for preventing the formation of the zinc phosphate coating on the back surface of the slide bearing must be preliminarily applied to the back surface. This necessity is a disadvantage of the zinc phosphate coating method in practice.

Namely, it should be understood that a satisfactory surface coating for the sliding surface formed by the aluminum alloy or the fiber-reinforced aluminum alloy and having an excellent seizure resistance and a superior abrasion resistance and a method of forming the satisfactory surface coating have not yet been provided.

SUMMARY OF THE INVENTION

An object of the present invention is to provide a metallic sliding material having a specific inorganic chemical conversion layer with excellent smoothness, lubricating property, and abrasion resistance and methods of producing the same.

Another object of the present invention is to provide a metallic sliding material free from a conventional plated overlay and having higher seizure resistance and abrasion resistance than those of conventional metallic sliding materials and methods of producing the same, without plating a conventional overlay thereon.

The above-mentioned objects can be attained by the metallic sliding material of the present invention, which comprises a support member having a sliding surface formed from an aluminum alloy or a reinforcing material-containing aluminum alloy; and an inorganic compound coating layer formed on the sliding surface, comprising at least one member selected from the group consisting of molybdenum compounds, tungsten compounds and chromium compounds in an amount of 2 to 70% by weight, in terms of the above-mentioned metals, and the balance consisting essentially of oxygen and optionally aluminum compounds and phosphorus compounds, and having a thickness of 0.1 to 20 $\mu$m. The reinforcing material-containing aluminum alloy is referred to as an aluminum alloy matrix composite material in which the aluminum alloy matrix is reinforced by a reinforcing material, for example, reinforcing ceramic fibers or particles.

In an embodiment of the metallic sliding material of the present invention, the inorganic compound coating layer comprises at least one member selected from the group consisting of molybdenum compounds, tungsten compounds and chromium compounds in an amount of 2 to 48% by weight, in terms of the above-mentioned metals, at least one aluminum compound in an amount of 1 to 25% by weight, in terms of aluminum, at least one phosphorus compound in an amount of 1 to 25% by weight, in terms of phosphorus, and the balance consisting essentially of oxygen.

The metallic sliding material as defined above can be produced by the method of the present invention which comprises bringing a sliding surface of a support member formed by an aluminum alloy or a reinforcing material-containing aluminum alloy into contact with an aqueous chemical conversion treatment solution containing at least one type of ions selected from the group consisting of molybdate ions, tungstate ions and chromate ions, and fluoride ions; and drying the resultant inorganic compound coating layer formed on the sliding surface.

Also, the metallic sliding material as defined above can be produced by the method of the present invention which comprises immersing a sliding surface of a support member formed from an aluminum alloy or a reinforcing material-containing aluminum alloy in an aqueous electrolytic treatment solution containing at least one type of ions selected from the group consisting of molybdate ions, tungstate ions and chromate ions to form an electrolytic system in which the sliding surface serves as a cathode; applying an electrolytic treatment to the sliding surface in the resultant electrolytic system; and drying the resultant inorganic compound coating layer formed on the sliding surface.

The above-mentioned embodiment of the metallic sliding material can be produced by the method of the present invention which comprises bringing a sliding surface of a support member formed from an aluminum alloy or a reinforcing material-containing aluminum alloy into contact with an aqueous chemical conversion treatment solution containing at least one type of ions selected from the group consisting of molybdate ions, tungstate ions and chromate ions, ions of at least one phosphorus compound selected from the group consisting of phosphoric acid, phosphorous acid and condensed phosphoric acid, and a fluoride ions; and drying the resultant inorganic compound coating layer formed on the sliding surface.

Also, the above-mentioned embodiment of the metallic sliding material can be produced by the method of the present invention which comprises immersing a sliding surface of a support member formed from an aluminum alloy or a reinforcing material-containing aluminum alloy in an aqueous electrolytic treatment solution containing at least one type of ions selected from the group consisting of molybdate ions, tungstate ions and chromate ions and ions of at least one phosphorus compound selected from the group consisting of phosphoric acid, phosphorous acid and condensed phosphoric acids, to form an electrolytic system in which the sliding surface serves as a cathode; applying an electrolytic treatment to the sliding surface in the resultant electrolytic system; and drying the resultant inorganic compound coating layer formed on the sliding surface.

The present invention covers a metallic sliding member-contacting metallic member composite article, comprising a metallic sliding member made of the metallic sliding material of the present invention, and containing a member made of at least one material selected from the group consisting of aluminum alloys, reinforcing material-containing aluminum alloys, steel materials having a HV of 400, cast iron materials, and steel materials nitriding-treated or plated with a metal, brought into contact with the sliding surface of the metallic sliding member; the sliding member and contacting member being capable of relatively sliding over each other.

In the metallic sliding member-contacting member composite articles of the present invention, the metallic sliding member is preferably selected from the group consisting of groove portions and a skirt portion of a piston, cylinder bore, valve lifter, valve spool for A/T oil pressure control, piston for brake master-cylinder and slide bearing, and the metallic contact member is preferably selected from the group consisting of a piston ring, cylinder bore, cylinder head, valve body and shaft corresponding to the sliding metallic member.

DESCRIPTION OF THE PREFERRED EMBODIMENTS

With respect to metallic sliding materials having an aluminum alloy layer, which were believed to have to been coated with a conventional overlay, the inventors of the present invention have carefully studied the sliding performance of metallic sliding materials in which the aluminum alloy layer surface has been coated with various chemical conversion coatings, to enhance the seizing resistance and the abrasion resistance without forming the conventional overlay thereon.

As a result, it was found that when a chemical conversion coating is formed from a conventional crystallizable compound, for example, zinc phosphate, aluminum sodium fluoride or manganese phosphate on a sliding surface of an aluminum alloy or reinforcing material-containing aluminum alloy layer, the resultant sliding surface is covered by coarse chemical conversion crystals having a large crystal size of 3 to 4 $\mu$m and exhibits a reduced smoothness, an increased frictional coefficient ($\mu$) and therefore a poor resistance to seizing under a high load.

Based on the above-mentioned finding, the inventors of the present invention have continued the study to obtain a new chemical conversion coating having no or a low crystallinity, high smoothness and hardness and thus exhibiting high abrasion resistance and heat resistance.

As a result, it has been found that by coating the aluminum alloy layer or the reinforcing material-containing aluminum alloy layer of a support with an inorganic compound coating containing at least one metal compound selected from molybdenum, tungsten and chromium compounds as a principal component, and the balance consisting essentially of oxygen, a metallic sliding material having a higher seizing resistance, a better abrasion resistance and a better running-in property of the alloy layer than those of the conventional zinc phosphate chemical conversion coating can be produced. Also, it has been found that the inorganic compound coating having the above-mentioned performance comprises at least one member selected from molybdenum, tungsten and chromium compounds in a total content of 2 to 70% by weight in terms of the above-mentioned metals, and the balance consisting essentially of oxygen.

As a result of the inventor's further research, it has been found that when an inorganic compound coating comprising at least one member selected from molybdenum, tungsten and chromium compounds as a principal component, an aluminum compound, a phosphorus compound and the balance consisting essentially of oxygen is formed on a sliding surface of an aluminum alloy layer or a reinforcing material-containing aluminum alloy layer of a support, the resultant metallic sliding material exhibits excellent seizing resistance, abrasion resistance and adhesion to the alloy layer. Also, it has been found that the inorganic compound layer comprises the molybdenum, tungsten and/or chromium compound in a total content of 2 to 48% by weight in terms of the above-mentioned metals, the aluminum compound in a content of 1 to 25% by weight in terms of aluminum, the phosphorus compound of 1 to 25% by weight in terms of phosphorus, and the balance consisting essentially of oxygen.

The inventors of the present invention have studied methods of producing the sliding material of the present invention, and found that the above-mentioned inorganic compound layer can be formed on the aluminum alloy layer or reinforcing material-containing aluminum layer of the support member by a chemical conversion treatment or an electrolytic chemical conversion treatment. According to this chemical conversion treatment, an aqueous treatment solution containing molybdate ions, tungstate ions and/or chromate ions, fluoride ions and optionally inorganic phosphorus compound ions, for example, phosphate ions is brought into contact with the alloy layer surface of the support member. According to the electrolytic chemical conversion treatment, the sliding surface of the support member formed from the aluminum alloy or reinforcing material-containing aluminum alloy is arranged as a cathode and electrolytically treated in an aqueous electrolytic solution having the same composition as that for the above-mentioned chemical conversion treatment, except that no fluoride ions are contained, to produce the metallic sliding material of the present invention. The present invention was completed based on the above-mentioned findings.

Figure 1:
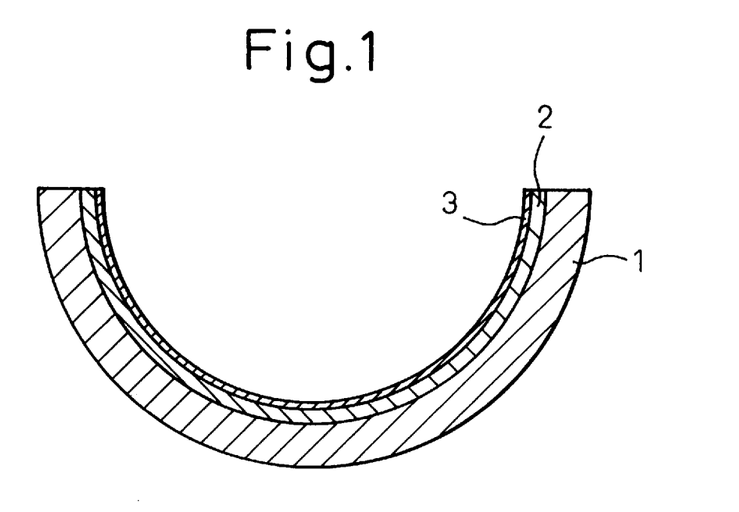
FIG. 1 is an explanatory cross-sectional view of a slide bearing which is an example of the metallic sliding material of the present invention.

FIG. 1 shows a cross-sectional view of a sliding bearing which is an example of the metallic sliding materials of the present invention. Referring to FIG. 1, an aluminum alloy layer or reinforcing material-containing aluminum alloy layer 2 is formed on a metallic base member 1, for example, a steel base member, to form a sliding surface, and an inorganic compound coating layer 3 is formed on the sliding surface.

In an embodiment of the metallic sliding material of the present invention, the inorganic compound layer comprises at least one member selected from molybdenum, tungsten and chromium compounds in a total amount of 2 to 70% by weight in terms of the above-mentioned metals and the balance consisting essentially of oxygen. In another embodiment of the metallic sliding materials of the present invention, the inorganic compound layer comprises at least one member selected from molybdenum, tungsten and chromium compounds in a total amount of 2 to 48% by weight in terms of the above-mentioned metals, at least one aluminum compound in a total amount of 1 to 25% by weight in terms of aluminum, at least one phosphorus compound in a total amount of 1 to 25% by weight in terms of phosphorus, and the balance consisting essentially of oxygen.

In the sliding material of the present invention, the support member has a sliding surface formed from an aluminum alloy or reinforcing material-containing aluminum alloy. The sliding surface-forming alloy layer may be formed on a metallic base member, for example, a steel base member.

The aluminum alloys usable for the present invention include Al-Sn-Cu alloys, for example, JIS H5402 AJ-1 (10%Sn, 0.75%Cu, 0.5%Ni and the balance consisting of Al), JIS H5402 AJ-2 (6%Sn, 2.5%Cu, 1.0%Ni and the balance consisting of Al), Al-Si alloys, Al-Sn-Si-Pb-Cu alloys, Al-Pb alloys and Al-Zn-Si-Cu-Pb alloys.

The fiber-reinforced alloys usable for the present invention include the same aluminum alloys as mentioned above except that they are reinforced with inorganic reinforcing ceramic fibers or particles, for example, alumina and/or silica fibers having a thickness of 0.1 to 200 ∞m and a length of 1 to 100 mm, or aluminum and/or silica particles having a size of 0.1 to 500 μm, in a content of 1 to 40% by volume.

The metallic base member (back metal) for the aluminum alloy or reinforcing material containing aluminum alloy layer may be made from, for example, a low carbon steel, high carbon steel, stainless steel or special steel. In an embodiment of the sliding material of the present invention, a laminate is formed by bonding the aluminum alloy sheet or reinforcing material-containing aluminum alloy sheet to the base member in such a manner that a surface of the alloy sheet forms a sliding surface of the laminate, and mechanically, worked into desired form and dimensions, and the sliding surface is finished and then coated with the inorganic compound coating layer of the present invention. The sliding material of the present invention may include no metallic base member.

The inorganic compound coating layer formed on the sliding surface has a thickness of 0.1 to 20 μm, preferably 0.2 to 4 μm. If the thickness is less than 0.1 μm, the resultant inorganic compound coating layer exhibits an unsatisfactory abrasion resistance-enhancing effect. Also, if the thickness is more than 20 μm, the resultant inorganic compound coating layer exhibits an insufficient adhesion to the aluminum alloy layer or the reinforcing material containing aluminum alloy layer.

In the present invention, the inorganic compound coating layer comprises at least one compound selected from compounds, for example, oxides, hydrated oxides and oxide complexes, of molybdenum, tungsten and chromium, and optionally, aluminum and phosphorus compound, for example, aluminum phosphate and aluminum phosphite. Also, the inorganic compound coating layer may contain a heteropolyacid salt, for example, molybdo-phosphoric acid salt. The inorganic compound coating layer has a grey, gold, brown or black color and sometimes exhibits interference bands (Moire fringe).

The inorganic compound coating layer is sometimes contaminated with a small amount of impurities, for example, Sn, Ni, Pb, and/or Si derived from the aluminum alloy and/or Na and/or F derived from the treatment solution. As far as the impurities are in a small amount, the contamination with the impurities does not affect on the sliding performance of the inorganic compound coating layer.

In a first embodiment of the sliding material of the present invention, the inorganic compound coating layer comprises at least one compound selected from molybdenum, tungsten and chromium compounds in a total content of 2 to 70% by weight, preferably 3 to 60% by weight, in terms of the above-mentioned metals, and the balance consisting essentially of oxygen.

In the first embodiment of the metallic sliding material of the present invention, if the total content of the molybdenum, tungsten and/or chromium compounds is less than 2% by weight in terms of the metals, the resultant inorganic compound coating layer exhibits an unsatisfactory abrasion resistance. Also, if the total content is more than 70% by weight in terms of the metals, the resultant inorganic compound coating layer exhibits an insufficient chemical stability.

In a second embodiment of the present invention, the inorganic compound coating layer comprises at least one compound selected from molybdenum, tungsten and chromium compounds in a total content of 2 to 48% by weight, preferably 10 to 42% by weight, in terms of the above-mentioned metals, at least one aluminum compound in a total content of 1 to 25% by weight, preferably 5 to 20% by weight, in terms of aluminum, at least one phosphorus compound in a total content of 1 to 25% by weight, preferably 5 to 23% by weight in terms of phosphorus, and the balance consisting essentially of oxygen.

In the second embodiment of the metallic sliding material of the present invention, if the total content of the molybdenum, tungsten and/or chromium compounds is less than 2% by weight in terms of the metals, or the total content of the aluminum or phosphorus compound is more than 25% by weight in terms of aluminum or phosphorus, the resultant inorganic compound coating layer exhibits a undesirably high surface roughness and an insufficient seizing resistance. Also, if the total content of the molybdenum, tungsten and/or chromium compounds is more than 48% by weight in terms of the metals or the content of the aluminum or phosphorus compound is less than 1% by weight in terms of aluminum or phosphorus, the resultant inorganic compound coating layer exhibits too high a surface roughness.

In a most preferable embodiment of the present invention, the inorganic compound coating layer comprises at least one compound selected from molybdenum, tungsten and chromium compounds in a total content of 25 to 42% by weight in terms of the above-mentioned metals, at least one aluminum compound in a total content of 5 to 15% by weight in terms of aluminum, at least one phosphorus compound in a total content of 7 to 17% by weight in terms of phosphorus and the balance consisting essentially of oxygen.

Immediately after the formation of the inorganic compound coating layer, the resultant layer contains a certain amount of hydrogen atoms derived from hydrating water and absorbed water. However, by drying or heat-drying the inorganic compound coating layer, the water is substantially completely removed from the coating layer and thus the content of hydrogen atoms derived from the above-mentioned water in the resultant inorganic compound coating layer becomes negligible.

Among the molybdenum compounds, tungsten compounds and chromium compounds for the inorganic compound coating layer, the molybdenum compounds and tungsten compounds are preferably employed because they are significantly contributory to enhancing the adhesion to the aluminum alloy layer and heat resistance of the resultant coating layer.

Where the aluminum alloy layer or the reinforcing material-containing aluminum alloy layer is formed on a steel base member, and the inorganic compound coating layer is formed on the aluminum alloy or reinforcing material-containing aluminum alloy layer, the back surface of the steel base member is simultaneously coated with a thin coating containing oxides of molybdenum, tungsten and/or chromium and iron phosphate and having a color between an interference color and black. Since this thin coating can impart a corrosion resistance and rust resistance to the steel base member, it is preferable that the inorganic compound coating is formed on the entire surface of the sliding material including not only the sliding surface but also the back surface thereof.

The methods of the present invention for producing the sliding material will be explained below.

A support member for the sliding material of the present invention has a finished surface thereof which is soiled by an oily substance, for example, a cutting oil. Therefore, the surface of the support member should be cleaned with an organic solvent or an aqueous cleaning liquid containing a surfactant, before the formation of the inorganic compound coating layer.

To produce the metallic sliding material of the first embodiment of the present invention having the inorganic compound coating layer comprising the molybdenum, tungsten and/or chromium compound and the balance consisting essentially of oxygen, the cleaned sliding surface of the support member is subjected to a chemical conversion treatment in which an aqueous chemical conversion treatment solution containing at least one type of ion selected from molybdate ions, tungstate ions and chromate ions and fluoride ions is brought into contact with the cleaned sliding surface of the support member by an immersion or spray procedure, or to an electrolytic treatment in which the sliding surface of the support member is immersed in an aqueous electrolytic treatment solution containing at least one type of ion selected from molybdate ions, tungstate ions and chromate ions to provide an electrolytic system in which the sliding surface serves as a cathode, an electrolytic treatment is applied to the sliding surface of the electrolytic system, and the resultant inorganic compound coating layer formed on the sliding surface is dried.

To produce the metallic sliding material of the second embodiment of the present invention having the inorganic compound coating layer comprising the molybdenum, tungsten and/or chromium compound, the aluminum compound, the phosphorus compound and the balance consisting essentially of oxygen, the cleaned sliding surface of the support member is subjected to a chemical conversion treatment in which an aqueous chemical conversion treatment solution containing at least one type of ion selected from molybdate ions, tungstate ions and chromate ions, and fluoride ions is brought into contact with the sliding surface of the support member, or to an electrolytic treatment in which the sliding surface of the support member is immersed in an aqueous electrolytic treatment solution containing at least one type of ion selected from molybdate ions, tungsten ions and chromate ions and ions of at least one phosphorus compound selected from phosphoric acid, phosphorous acid and condensed phosphoric acids, to form an electrolytic system in which the sliding surface serves as a cathode; an electrolytic treatment is applied to the sliding surface in the resultant electrolytic system; and the resultant inorganic compound layer formed on the sliding surface is dried.

The molybdate ions, tungstate ions and chromate ions usable for the present invention can be generated by dissolving orthoacid or polyacids of these metals or water-soluble salts of the acids in water. Namely, in the resultant aqueous solution, the resultant ions include, for example, polymolybdate ions ($Mo_7O_{24}B^-$), polytungstate ions ($W_8O_{26}^{4-}$) and dichromate ions ($Cr_2O_7^{2-}$). Preferably, the aqueous solution containing molybdate ions, tungstate ions and/or chromate ions is prepared by dissolving ammonium or alkali metal salts of the metal acids, for example, ammonium molybdate, sodium molybdate, potassium tungstate or sodium dichromate.

In the methods of the present invention, the aqueous solution for the chemical conversion treatment or the electrolytic treatment comprises the molybdate ions, tungstate ions and/or chromate ions in a total content of 0.1 to 400 g/liter. If the total content of the ions is less than 0.1 g/liter, the resultant inorganic compound coating layer may have an insufficient thickness. Also, if the total content is more than 400 g/liter, the resultant aqueous solution may be saturated and a portion of the ions may be deposited, and thus the aqueous solution may be unstable and unusable for practice. Preferably, the total content of the molybdate ions, tungstate ions and/or chromate ions is in the range of from 1 to 100 g/liter.

In the chemical conversion treatment method of producing the metallic sliding material of the second embodiment of the present invention, the phosphorus compound ions can be generated by dissolving phosphoric acid, phosphorous acid, condensed phosphoric acids, and/or water-soluble salts of the above-mentioned acids, for example, sodium phosphate, ammonium phosphate, potassium phosphite, sodium pyrophosphate. Preferably, acidic salts of phosphoric acid, for example, monosodium phosphate and monoammonium phosphate, are used as a source of the phosphorus compound ions.

The ions of the phosphorus compound selected from phosphoric acid, phosphorous acid and condensed phosphoric acids are present preferably in a content of 0.1 to 300 g/liter, more preferably 0.5 to 100 g/liter, in the aqueous treatment solution.

In the chemical conversion treatment method, the aqueous treatment solution contains fluoride ions. In this case, the fluoride ions can be generated by dissolving a water-soluble fluoride compound, for example, sodium fluoride, sodium hydrogen fluoride, potassium fluoride, ammonium fluoride, sodium borofluoride, sodium silicofluoride, hydrogen fluoride, hydrogen borofluoride, hydrogen silicofluoride, hydrogen zirconofluoride or hydrogen titanofluoride, in water.

The content of the fluoride ions in the aqueous treatment solution is preferably 0.02 to 100 g/liter, more preferably 0.1 to 5 g/liter, determined by a fluoride ion meter.

If the content of the fluoride ions is less than 0.02 g/liter, the resultant aqueous treatment solution may exhibit an insufficient etching effect on the sliding surface formed from the aluminum alloy or the reinforcing material containing aluminum alloy, and thus no inorganic compound coating layer may be formed. Also, if the content of the fluoride ions is more than 100 g/liter, the resultant sliding surface of the sliding material may exhibit too high a surface roughness and thus a reduced sliding performance.

In the chemical conversion treatment methods of the present invention, the aqueous treatment solution optionally contains an oxidizing agent, for example, nitrate ions or hydrogen peroxide, which are contributory to enhancing the coating-formation rate or the stability of the aqueous treatment solution.

To provide the inorganic compound coating layer having a satisfactory surface smoothness and a sufficient amount, the pH of the aqueous treatment solution is preferably controlled to 2 to 7, more preferably 3 to 6. When the aqueous treatment solution contains an acidic salt of phosphoric acid, for example, monosodium phosphate or monoammonium phosphate, as a phosphorus compound, the resultant aqueous solution naturally exhibits a pH value within the preferred range without specifically adjusting the pH value.

In the chemical conversion treatment method, the aqueous treatment solution is preferably applied to the sliding surface at a temperature of 20° to 80° C. for a time of 5 to 60 seconds, which time is variable in response to the content of fluoride ions in the aqueous solution and the treatment temperature.

Where the electrolytic treatment method is applied to form the inorganic compound coating layer, this electrolytic treatment is preferably carried out at a cathode electric current density of 0.2 to 20 A/dm$^2$. In this electrolytic treatment, the anode is preferably formed from a insoluble electrode-forming material, for example, a platinum-plated titanium, DSE, carbon or stainless steel. Also, in the electrolytic treatment method, the adhesion of the resultant inorganic compound coating layer to the sliding surface can be further enhanced by maintaining the sliding surface immersed in the aqueous electrolytic treatment solution for a time of from several seconds to several tens of seconds before the start of the electrolytic treatment.

To enhance the coating-formation rate and the stability of the aqueous treatment solution in the electrolytic treatment method, an oxidizing agent, for example, nitrate ions or hydrogen peroxide is optionally added to the aqueous treatment solution. Generally, the electrolytic treatment solution should contain substantially no fluoride ions which affect the working life of the anode. However, the fluoride ions may be contained in a small content in the electrolytic treatment solution as long as the influence of the fluoride ions is negligible in practice.

The electrolytic treatment is preferably carried out at a temperature of from 20° to 70° C. for a time of from 10 to 180 seconds which is variable depending on the current density.

When the chemical conversion treatment or the electrolytic treatment for the sliding surface is completed, the resultant inorganic compound coating layer is immediately rinsed with water and then dried. The drying procedure is preferably carried out under such conditions that the resultant hydrated oxide compounds contained in the coating layer are effectively dehydrated at an accelerated dehydration rate and the resultant coating layer is stabilized. For this purpose, the coating layer is preferably heat-dried at a temperature of 80° to 150° C. for several seconds to several minutes.

In the sliding material of the present invention, the inorganic compound coating layer comprises at least one compound of molybdenum, tungsten and/or chromium, at least one aluminum compound, at least one phosphorus compound and oxygen.

The above-mentioned compounds in the coating layer are amorphous or in the form of very fine crystals, and do not cause an increase in surface roughness of the resultant coating layer. Therefore, the inorganic compound coating layer of the present invention has a low frictional coefficient, a high adhesion to the aluminum alloy and a satisfactory hardness.

In the metallic sliding material of the present invention, the specific inorganic compound coating layer is formed on the relatively soft aluminum alloy or reinforcing material containing aluminum alloy layer. Therefore, the resultant sliding surface exhibits an enhanced abrasion resistance.

Further, when a large load is applied locally to the sliding material so as to elastically or plastically deform the aluminum alloy or reinforcing material containing aluminum alloy layer, the specific inorganic compound coating layer can follow the elastic or plastic deformation of the aluminum alloy or reinforcing material containing aluminum alloy layer without peeling from the alloy layer. The elastic or plastic deformation can effectively break up the applied load and enhance the seizing resistance of the sliding material, and does not cause the adhesion of the inorganic compound coating layer to the aluminum alloy or reinforcing material containing aluminum alloy layer to fail.

When the inorganic compound coating layer is dried or heat-dried, almost all of the hydrating water of the inorganic compound is removed. Sometimes, the removal of the hydrating water causes the inorganic compound coating layer to shrink in volume and slight cracks are formed in the coating layer. However, the formation of the slight cracks does not cause the adhesion of the coating layer to the aluminum alloy layer to reduce even when a load is applied to the sliding surface, and thus the slightly cracked inorganic compound coating layer can exhibit an excellent abrasion resistance and sliding performance.

In the present invention, a metallic sliding member made of the metallic sliding material of the present invention can be combined with a contacting member made of at least one material selected from aluminum alloys, reinforcing material containing aluminum alloys, steel materials having a HV of 400, cast iron materials and steel materials treated by nitriding or plated with a metal, and brought into contact with the sliding surface of the metallic sliding member, to provide a metallic sliding member-contacting member composite article in which the sliding member and the contacting member can slide relative to each other.

In the metallic sliding member-contacting member composite article of the present invention, the sliding member may be selected from groove portions and skirt portions of a piston, cylinder bore, valve lifter, valve spool for automatic transmission (A/T) oil pressure control, piston for break master cylinder and slide bearing, and the contacting member may be selected from a piston ring, cylinder bore, cylinder head, valve body and shaft corresponding to the sliding member.

EXAMPLES

The present invention will be further explained by the following examples.

Examples 1 to 15 and Comparative Examples 1 to 3

In each of Examples 1 to 15 and Comparative Examples 1 to 3, a bi-metal was prepared by roll-bonding a bearing-forming thin aluminum alloy (Al-6Sn-1Cu-Ni alloy) sheet to a steel base sheet by a rolling method, and annealing the roll-bonded article at a temperature of 350° C. for 4 hours, to provide a support member for a slide bearing.

A specimen of a slide bearing was prepared by cutting the bi-metal and mechanically working the cut piece. The specimen was cleaned with an aqueous cleaning solution containing 20 g/liter of an aluminum cleaning agent (trademark: Fine Cleaner 315, made by Nihon Parkerizing Co.) at a temperature of 70° C. for 2 minutes, rinsed with water. Then, the cleaned specimen was subjected to the inorganic compound coating layer-forming treatment as shown in Tables 1 and 2, rinsed with water and finally dried at a temperature of 120° C. for 5 minutes.

Tables 1 and 2 show the surface treatment conditions and the amount and composition of the resultant inorganic compound coating layer of each of Examples 1 to 15 and Comparative Examples 1 to 3.

In each of Examples 12, 13, 14 and 15, the formation of the inorganic compound coating layer was carried out by applying an electrolytic treatment to the bearing specimen by using a platinum-plated titanium anode and a cathode consisting of the bearing specimen per se. In the electrolytic treatment, the applied cathode current density was 0.5 A/dm$^2$ in Example 12, 10 A/dm$^2$ in Example 13 and 2 A/dm$^2$ in Examples 14 and 15.

In each of Examples 1 to 11 and Comparative Examples 1 to 3, the treatment solution was brought into contact with the bearing specimen by a spray method or an immersion method to form an inorganic compound coating layer on the bearing specimen.

In each of the treatment solutions, molybdate ions were generated from ammonium molybdate dissolved in water, tungstate ions from sodium tungstate, chromate ions from ammonium dichromate, fluoride ions from sodium fluoride or ammonium fluoride. The concentrations of the ions were adjusted to the values shown in Tables 1 and 2.

Also, in the treatment solution, phosphate ions were generated from sodium phosphate dissolved in the solution, phosphite ions were generated from sodium phosphite and pyrophosphate ions and tripolyphosphate ions were generated from potassium salts of pyrophosphoric acid and tri-polyphosphoric acid.

In Comparative Example 3, the treatment solution for forming the inorganic compound coating layer was prepared by dissolving 3.8 g of zinc oxide in 30 g of phosphoric acid, diluting the resultant solution with water into a total volume of one liter and adding sodium hydroxide to the diluted solution to adjust the pH value of the solution to 3 to 3.5. The resultant solution was applied to the bearing specimen to form a comparative inorganic compound coating layer thereon. The contents of molybdenum, tungsten, chromium, aluminum and phosphorus in the resultant inorganic compound coating layer was determined by a quantitative analysis using an X-ray photoelectronic spectro-photometer (XPS, trademark ESCA-850M, made by Shimazu Seisakusho).

Also, it was confirmed that in the resultant inorganic compound coating layer of each of Examples 1 to 15 and Comparative Examples 1 to 3, the balance of the molybdenum, tungsten, chromium, aluminum and phosphorus consisted essentially of oxygen alone.

The total amount (weight) of the inorganic compound coating layer was determined by masking the surface portions other than the coated sliding surface of the resultant slide bearing specimen, dissolving away the coating layer on the sliding surface with a 36% nitric acid and measuring a difference in weight between the resultant specimen and the coating layer-removed specimen.

TABLE 1

Surface treatment conditions and coating compositions

| Example No. | Molybdate ions | Tungstate ions | Chromate ions | Phosphorus compound ions Type | Content (g/l) | Fluoride ions | Time (sec) | Temperature (°C) | Mo | W | Cr | Al | P | Thickness (μm) | Surface roughness (μm) |
|---|---|---|---|---|---|---|---|---|---|---|---|---|---|---|---|
| Example 1 | 5 | 5 | — | — | — | 1 | 60 | 65 | 30 | 28 | — | — | — | 1.5 | 1.8 |
| 2 | 6 | — | — | — | — | 4 | 120 | 55 | 62 | — | — | — | — | 2.3 | 1.9 |
| 3 | 1 | — | 0.5 | — | — | 40 | 40 | 85 | 12 | — | 10 | — | — | 0.2 | 1.6 |
| 4 | 10 | — | — | Phosphate ions | 20 | 2 | 120 | 65 | 35 | — | — | 10 | 12 | 1.6 | 1.5 |
| 5 | 6 | 2 | — | " | 50 | 5 | 240 | 75 | 20 | 12 | — | 8 | 11 | 3.0 | 1.9 |
| 6 | — | 30 | — | " | 12 | 0.2 | 30 | 40 | — | 22 | — | 14 | 18 | 0.2 | 1.2 |
| 7 | 3 | — | 1 | " | 120 | 20 | 180 | 65 | 2 | — | 1 | 17 | 23 | 1.5 | 1.4 |
| 8 | 85 | 0.5 | 1 | Phosphite ions | 3 | 3.5 | 180 | 80 | 32 | 1 | 3 | 2 | 2 | 4.0 | 2.0 |
| 9 | 25 | — | 3 | Phosphate ions | 30 | 1.5 | 60 | 70 | 31 | — | 6 | 8 | 10 | 0.8 | 1.2 |
| 10 | 3 | — | 0.2 | Pyrophosphate ions | 2 | 1.2 | 120 | 70 | 24 | 2 | 18 | 10 | 12 | 1.5 | 1.4 |
| 11 | 15 | — | — | Tripolyphosphate ions | 2 | 0.8 | 120 | 70 | 38 | — | — | 2 | 3 | 2.1 | 1.3 |
| 12 | — | 25 | 5 | — | — | — | 50 | 40 | — | 45 | 15 | — | — | 4.2 | 2.3 |
| 13 | 60 | — | 3 | Phosphate ions | 10 | — | 20 | 60 | 31 | — | 6 | 0.1 | 18 | 3.1 | 2.1 |
| 14 | 3 | 0.2 | — | — | — | — | 10 | 30 | 35 | 1 | — | — | — | 1.2 | 1.2 |
| 15 | 8 | — | 1 | Pyrophosphate ions | 1 | — | 15 | 40 | 30 | — | 1 | — | 4 | 2.5 | 1.8 |

TABLE 2

Surface treatment conditions and coating compositions

| Example No. | Molybdate ions | Tungstate ions | Chromate ions | Phosphorus compound ions Type | Content (g/l) | Fluoride ions | Time (sec) | Temperature (°C) | Mo | W | Cr | Al | P | Thickness (μm) | Surface roughness (μm) |
|---|---|---|---|---|---|---|---|---|---|---|---|---|---|---|---|
| Comparative Example 1 | — | — | — | Phosphate ions | 20 | 2 | 120 | 70 | — | — | — | 11 | 22 | 2.5 | 4.4 |
| 2 | 5 | 2 | — | — | — | — | 120 | 60 | 5 | 2 | — | 6 | — | 1.2 | 1.8 |
| 3 | Zn: 3 g/l | | | Phosphate ions | 15 | 2 | 180 | 60 | Zn: 58 | | | 2 | 32 | 3.5 | 4.8 |

The specimen obtained in each of Examples 1 to 15 and Comparative Examples 1 to 3 was subjected to a seizing resistance test and an abrasion resistance test by using a rotational loading tester.

The conditions of the tests are shown below.

Seizing resistance test
Tester: Static load bearing tester
Rotation: 5000 rpm
Sliding speed: 12.5 m/sec
Oil supply temperature: 100°±2° C.
Oil supply rate: 0.1 liter/min
Lubricant oil: SAE 10W-30
Shaft material: S50C (Quenched, surface roughness (Rz): 0.8 μvm)
Determination: When the temperature at the back face of the specimen rapidly increased or the tester was overloaded, the load of the tester was measured as a seizing load of the specimen.

Abrasion resistance test
Tester: Static load bearing tester
Rotation: 5000 rpm
Sliding speed: 12.5 m/sec
Surface pressure: 50 MPa
Oil supply rate: 0.1 liter/min
Lubricant oil: SAE 10W-30
Shaft material: S50C (Quenched, surface roughness (Rz): 0.8 μm)
Testing time: 10 hrs The test results are shown in FIGS. 2 and 3.

Figure 2:
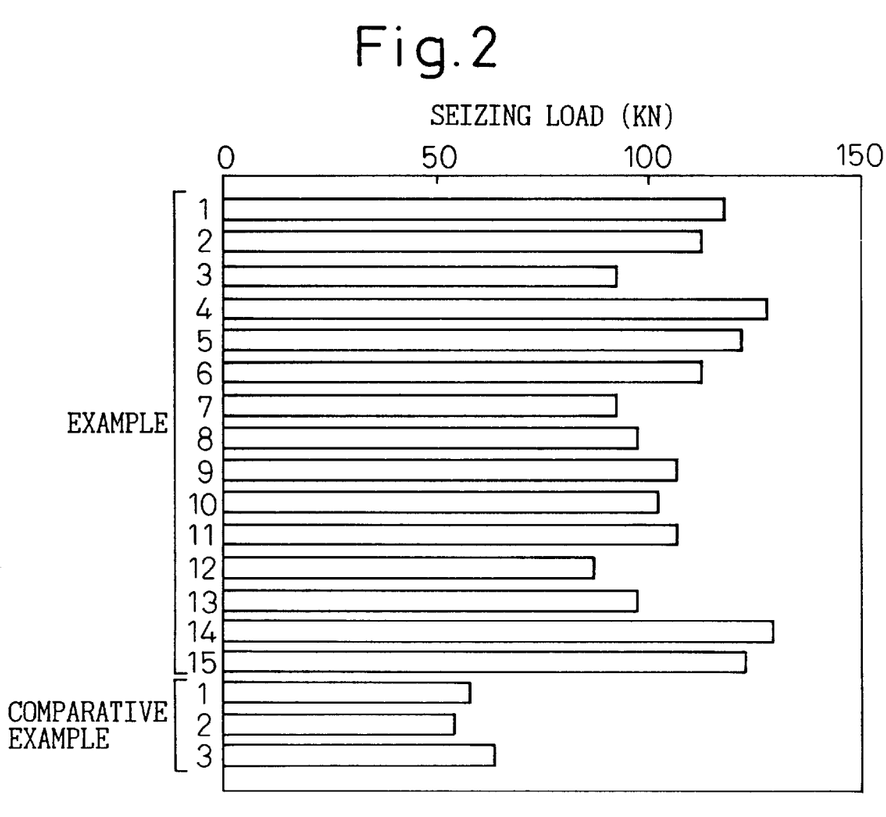
FIG. 2 is a graph showing results of a seizing test applied to the metallic sliding materials of Examples 1 to 15 and Comparative Examples 1 to 3.
Figure 3:
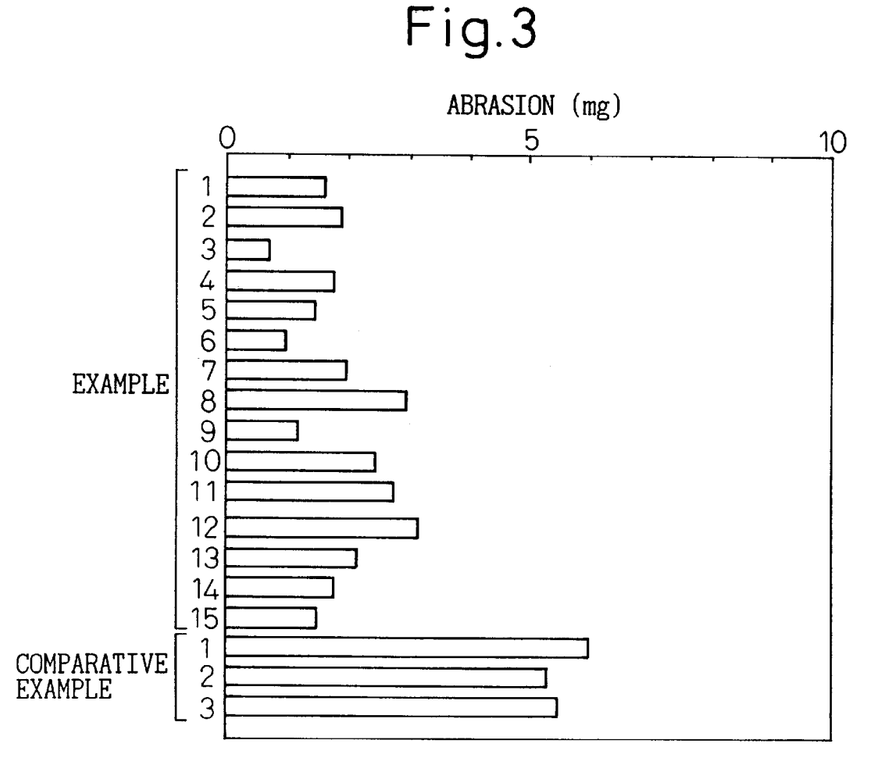
FIG. 3 is a graph showing results of an abrasion test applied to the metallic sliding materials of Examples 1 to 15 and Comparative Examples 1 to 3.

Tables 1 and 2 and FIGS. 2 and 3 show that the inorganic compound coating layer of the present invention formed on the sliding surface-forming metallic layer is contributory to enhancing the seizing resistance and the abrasion resistance of the sliding material. Also, the inorganic compound coating layer of the sliding material of the present invention exhibits a better sliding performance than that of the sliding material of Comparative Example 3 in which a conventional zinc phosphate coating layer was formed on the sliding surface.

Examples 16 to 23 and Comparative Examples 4 to 6

In each of Examples 16 to 23 and Comparative Examples 4 to 6, a sliding member was produced by the same procedures as in Example 1 with the following exceptions.

The composition of the surface treatment solution, the treatment time and treatment solution temperature were as shown in Table 3.

compound coating layer, rinsed with water and dried at a temperature of 120° C. for 5 minutes.

Table 4 shows the support member and the surface treatment conditions for the sliding member and the material and the surface treatment for a contacting member to be contact-slided on the sliding member, of Examples 16 to 23 and Comparative Examples 4 to 6.

The contacting member used was a cylindrical test piece having a diameter of 25 mm. This contacting member was produced by applying a gas soft nitrogenation treatment, chromium-plating, SiC-dispersed Ni-P alloy-plating or no treatment to a sliding surface (2 mm$^2$) of a steel (SUS 440C) cylinder.

TABLE 3

| | Surface treatment conditions | | | | | | | |
|---|---|---|---|---|---|---|---|---|
| | Composition of treatment solution (g/liter) | | | | | | Surface treatment | |
| Type of treatment solution | Molybdate ions | Tungstate ions | Chromate ions | Phosphate compound ions | | Fluoride ions | Time (sec) | Temperature (°C.) |
| | | | | Type | Content (g/l) | | | |
| 60Mo | 5 | — | — | — | — | 4 | 120 | 55 |
| 30Mo—28W | 6 | 5 | — | — | — | 1 | 60 | 65 |
| 12Mo—10Cr | 1 | — | 1 | — | — | — | 40 | 85 |
| 35Mo—10Al—12P | 10 | — | — | Phosphate ions | 20 | 2 | 120 | 65 |
| 20Mo—12W—8Al—11P | 6 | 2 | — | Phosphate ions | 50 | 5 | 240 | 75 |

The support member was selected from the following materials.

(A) A plate of an aluminum alloy (JIS AC8A, 30 mm×30 mm×2 mm)

(B) A plate of an alumina-silica reinforcing material containing aluminum alloy (MMC, 30 mm×30 mm×2 mm)

TABLE 4

| | | Item | | | |
|---|---|---|---|---|---|
| | | Sliding member (Plate test piece) | | Contacting member (Cylindrical test piece) | |
| Example No. | | Sliding surface-forming material | Surface treatment solution | Material | Surface treatment |
| Example | 16 | A | (60Mo) | Steel (HV 1000) | Gas soft nitrogenation |
| | 17 | A | (30Mo—28W) | " | " |
| | 18 | A | (42Mo—10Cr) | " | " |
| | 19 | A | (20Mo—12W—8Al—11P) | " | " |
| | 20 | A | (20Mo—12W—8Al—11P) | " | Chromium-plating |
| | 21 | A | (20Mo—12W—8Al—11P) | " | Ni—P—SiC-plating |
| | 22 | A | (20Mo—12W—8Al—11P) | Steel (HV 400) | — |
| | 23 | B | (20Mo—12W—8Al—11P) | " | Gas soft nitrogenation |
| Comparative Example | 4 | A | — | " | " |
| | 5 | A | Anode oxidation treatment | " | " |
| | 6 | B | — | " | " |

Note:
A: Aluminum alloy
B: Alumina-silica reinforcing material containing aluminum alloy (MMC)
Thickness of coating: about 2 to 5 μm The support member was cleaned with an aqueous solution containing 20 g/liter of an aluminum cleaning agent (trademark: Fine Cleaner 315, made by Nihon Parkerizing Co.) at a temperature of 70° C. for 2 minutes, rinsed with water, subjected to a surface treatment to form an inorganic Examples 24 to 27 and Comparative Examples 7 and 8

In each of Examples 24 to 27 and Comparative Examples 7 and 8, the support member (A) (aluminum alloy plate) was pre-treated by the same procedures as in Example 16, and then subjected to the inorganic compound coating layer-forming treatment using the surface treatment solution shown in Table 5.

In Comparative Example 7, an electric plating with tin was applied, and in Comparative Example 8, a no-electrolytic iron-plating was applied in place of the inorganic compound coating layer-forming treatment.

The contacting member was composed of a cylindrical test piece having a diameter of 25 mm and made from a cast iron (FC23), an alumina-silica reinforcing material containing aluminum alloy or an alumina-silica reinforcing material containing aluminum alloy coated with an inorganic compound coating layer, as shown in Table 5.

Tester: Suzuki-type thrust tester (Ring-on-plate tester)
Rotation: 1500 rpm (2.0 m/s)
Load: Stepwise increasing manner (10 kgf/step)
Lubricant oil: SW-20 base oil (No temperature control)
Amount of lubricant oil: 200 ml oil bath
Abrasion resistance test
Tester: Suzuki-type thrust tester (Ring-on-plate tester)
Rotation: 1500 rpm (2.0 m/s)
Load: 150 kgf
Test time: 2 hrs
Lubricant oil: 5W-30 base oil (No temperature control)

TABLE 5

| | | Item | | |
|---|---|---|---|---|
| | Sliding member (Plate test piece) | | Contacting member (Cylindrical test piece) | |
| Example No. | Sliding surface-forming material | Surface treatment solution | Material | Surface treatment |
| Example 24 | A | (60Mo) | Cast iron (FC 23) | — |
| 25 | A | (35Mo—10Al—12P) | Cast iron (FC 23) | — |
| 26 | A | (35Mo—10Al—12P) | MMC | — |
| 27 | A | (95Mo—10Al—12P) | MMC | Inorganic compound coating |
| Comparative 7 | A | Sn-plating (electric) | Cast iron (FC 23) | — |
| Example 8 | A | Fe-plating (Non-electrolytic) | Cast iron (FC 23) | — |

Examples 28 to 32 and Comparative Examples 9 and 10

In each of Examples 28 to 32 and Comparative Examples 9 to 10, a sliding member was produced by the same procedures as in Example 16 using the support member (A) (aluminum alloy plate) with the following exceptions.

The treatment solution used was as indicated in Table 6. In Comparative Examples 9 and 10, no coating treatment was applied.

The contacting member was a cylindrical test piece with a diameter of 25 mm and made from a non-surface treated aluminum alloy (AC2C or ADC 10), an anode oxidation-treated aluminum alloy, Fe-0.8C flame spray-treated aluminum alloy or non-electrolytic alloy Ni-P alloy-plated aluminum alloy, as shown in Table 6.

Amount of lubricant oil: 200 ml oil bath

The seizing resistance test was carried out as follows. With respect to each combination of the sliding member with the contacting member, a lubricant oil was applied to a contact-sliding portion of the combination, the contacting member (cylindrical test piece) was rotated at a rotation of 1500 rpm, the sliding member (plate test piece) was brought into contact with the rotating contacting member under a load which was increased stepwise by 10 kgf/step, and then an lower limit seizing load was determined.

The abrasion resistance test was carried out by rotating the contacting member brought into contact with the sliding member under a load of 150 kgf in the lubricant oil for 2 hours. After completing the rotation, the abrasion depth of the sliding member (plate test piece) was measured.

Figure 4:
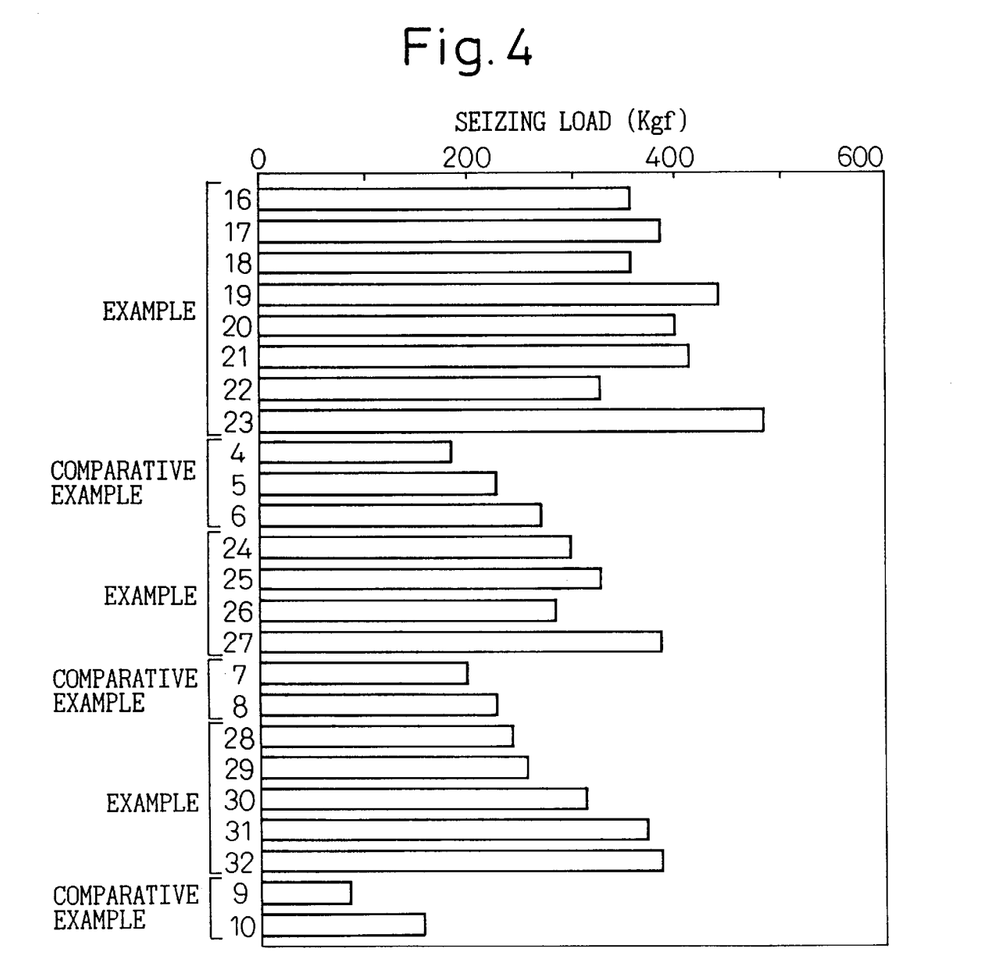
FIG. 4 is a graph showing results of a seizing test applied to the metallic sliding member-contacting member composite materials of Examples 16 to 32 and Comparative Examples 4 to 10.
Figure 5:
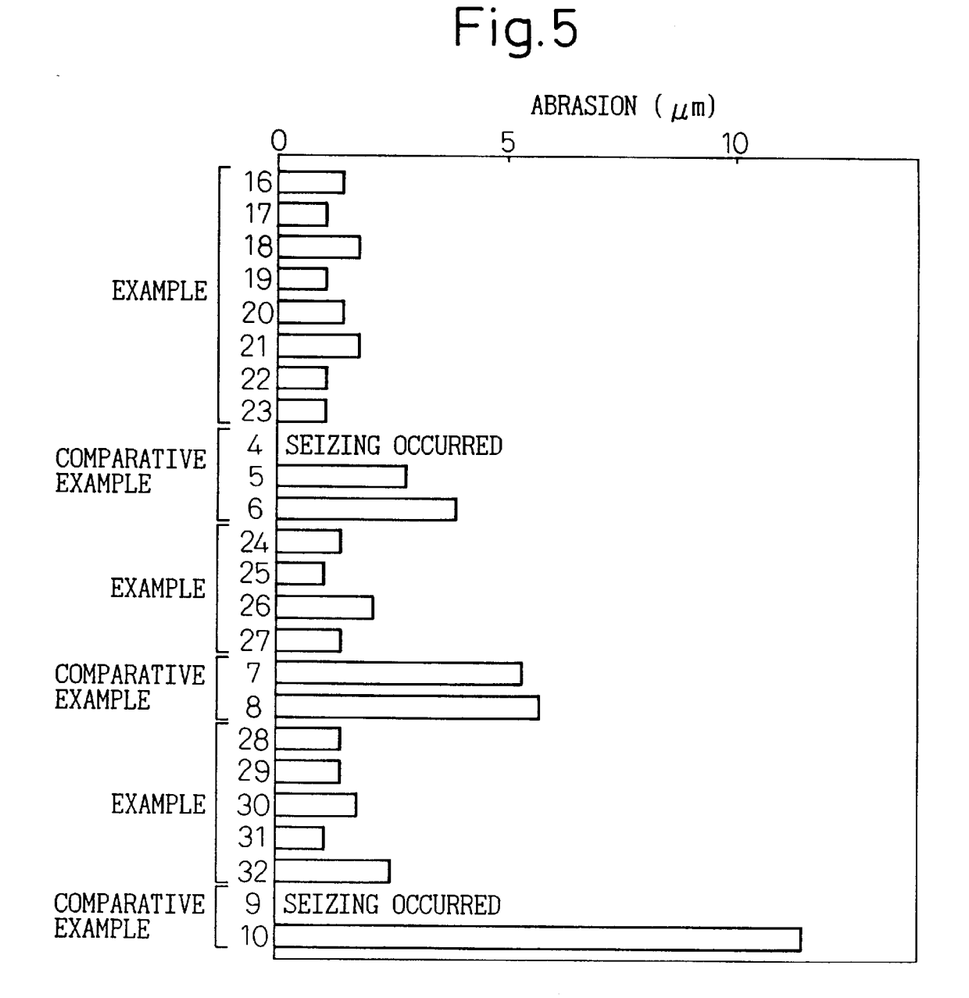
FIG. 5 is a graph showing results of an abrasion test applied to the metallic sliding member-contacting member composite materials of Examples 16 to 32 and Comparative Examples 4 to 10.

The test results are shown in FIGS. 4 and 5.

TABLE 6

| | | Item | | |
|---|---|---|---|---|
| | Sliding member (Plate test piece) | | Contacting member (Cylindrical test piece) | |
| Example No. | Sliding surface-forming material | Surface treatment solution | Material | Surface treatment |
| Example 28 | A | (30Mo—28W) | Al alloy | (AC2C) |
| 29 | A | (60Mo) | Al alloy | (AC2C) |
| 30 | A | (20Mo—12W—8Al—11P) | Al alloy | (ADC 10) |
| 31 | A | (30Mo—28W) | Al alloy | Anode oxidation treatment (ADC 10) |
| 32 | A | (30Mo—28W) | Al alloy | Fe—0.8C flame spray coating |
| Comparative 9 | A | — | Al alloy | (AC2C) |
| Example 10 | A | — | Al alloy | Anode oxidation treatment |

In each of Examples 15 to 32 and Comparative Examples 4 to 10, the sliding member-contacting member combination was subjected to the following tests.

Seizing resistance test

FIG. 4 shows that in the sliding materials of Examples 16 to 23, the inorganic compound coating layers were significantly contributory to enhancing the seizing resistance in comparison with that of Comparative Examples 4 to 6.

Especially, the ceramic reinforcing material containing aluminum alloy (MMC) was more contributory to enhancing the seizing resistance than the non-reinforced aluminum alloy.

Also, the lower limit seizing load varies depending on the type of the contacting member. The combination of the contacting member made from the nitrogenation-treated steel with the sliding member exhibited the best sliding performance.

In Examples 24 to 27, the same support member as in Example 16 was employed, and the contacting members combined with the sliding members were varied.

The combination of the sliding member of the present invention with the contacting member made of a cast iron or MMC corresponds to a practical combination of a piston skirt with a cylinder bore.

The same as in Example 16, the inorganic compound coating layer of the present invention enables the resultant sliding member to exhibit a higher seizing resistance than that derived from the conventional Sn-plated layer or Fe-plated layer as shown in Comparative Examples 7 and 8.

In Examples 28 to 32, the material and surface treatment for the contacting member are different from those in Examples 16 to 23 and 24 to 27. The resultant sliding member-contacting member combinations of Examples 28 to 32 exhibited higher seizing resistance due to the specific inorganic compound coating layer of the present invention than that of Comparative Example 9 in which no surface treatment was applied and of Comparative Example 10 which an anode oxidation treatment was applied.

FIG. 5 shows that the sliding members of Examples 16 to 23 having the inorganic compound coating layers formed on the support member surfaces in accordance with the present invention exhibited significantly enhanced abrasion resistance in comparison with those of Comparative Examples 5 and 6.

Also, in Examples 24 to 27 and 28 to 32, the resultant sliding members exhibited significantly decreased abrasion in comparison with those of the comparative examples.

In Comparative Examples 4 and 9, a seizing phenomenon occurred during the abrasion resistance test, and thus the abrasion resistances could not be determined.

From the abrasion resistance test for the sliding member-contacting member combinations of Examples 16 to 32 and Comparative Examples 4 to 10, it is clear that the specific inorganic compound coating layers of the present invention are significantly contributory to enhancing the sliding performance, namely the seizing resistance and abrasion resistance, of the metallic sliding materials.

We claim:

1. A metallic sliding material comprising:

a support member having a sliding surface formed from an aluminum alloy or a reinforcing material-containing aluminum alloy; and an inorganic compound coating layer formed on the sliding surface and having a thickness of 0.1 to 20 $\mu$m, the inorganic compound coating layer consisting essentially of at least one member selected from the group consisting of molybdenum compounds, tungsten compounds, and chromium compounds, at least one aluminum compound, at least one phosphorus compound, and oxygen present in such concentrations that molybdenum, tungsten, and chromium collectively constitute 2 to 48% by weight of the inorganic compound coating layer, aluminum constitutes 1 to 25% by weight of the inorganic compound coating layer, and phosphorus constitutes 1 to 25% by weight of the inorganic compound coating layer.

2. A metallic sliding material according to claim 1, wherein the inorganic compound coating layer includes at least one molybdenum compound.

3. A metallic sliding material according to claim 1, wherein the inorganic compound coating layer includes at least one tungsten compound.

4. A metallic sliding material according to claim 1, wherein the inorganic compound coating layer includes at least one chromium compound.

5. A metallic sliding member-contacting metallic member composite article, comprising:

a metallic sliding member made from the metallic sliding material as claimed in claim 1; and a contacting member contacting the sliding surface of the metallic sliding member, the contacting member being made from at least one material selected from the group consisting of aluminum alloys, reinforcing material-containing aluminum alloys, and steel materials nitriding-treated or plated with a metal, wherein the metallic sliding member and contacting member are slidable relative to each other.

6. A metallic sliding member-contacting metallic member composite article according to claim 5, wherein the metallic sliding member is a member selected from the group consisting of groove and skirt portions for a piston, a cylinder bore, a valve lifter, a valve spool for automatic transmission oil pressure control, a piston for brake master cylinder and a slide bearing, and further wherein the contacting member is a member selected from the group consisting of a piston ring, a cylinder bore, a cylinder head, a valve body and a shaft operatively corresponding to the metallic sliding member.

* * * * *